United States Patent
Popplewell et al.

(10) Patent No.: US 9,083,455 B2
(45) Date of Patent: Jul. 14, 2015

(54) REDUCED CLOCK FEED-THROUGH SYSTEMS, METHODS AND APPARATUS

(75) Inventors: Peter Harris Robert Popplewell, Ottawa (CA); Jakub F. Pingot, Ottawa (CA); Florinel G. Balteanu, Ottawa (CA)

(73) Assignee: Skyworks Solutions, Inc., Woburn, MA (US)

( * ) Notice: Subject to any disclaimer, the term of this patent is extended or adjusted under 35 U.S.C. 154(b) by 185 days.

(21) Appl. No.: 13/597,693

(22) Filed: Aug. 29, 2012

(65) Prior Publication Data

US 2013/0052968 A1 Feb. 28, 2013

Related U.S. Application Data

(60) Provisional application No. 61/529,191, filed on Aug. 30, 2011.

(51) Int. Cl.
*H04B 1/00* (2006.01)
*H04B 7/00* (2006.01)
*H04B 15/06* (2006.01)

(52) U.S. Cl.
CPC ..................................... *H04B 15/06* (2013.01)

(58) Field of Classification Search
CPC ..... H04W 52/24; H04W 52/12; H04W 52/20; H04L 1/0003; H04L 1/0026
USPC ........ 455/67.11–67.13, 68–71, 75–78, 550.1; 375/355, 371, 373–376
See application file for complete search history.

(56) References Cited

U.S. PATENT DOCUMENTS

| | | | |
|---|---|---|---|
| 5,168,174 A | 12/1992 | Naso et al. | |
| 7,512,388 B2 | 3/2009 | Snider | |
| 7,634,035 B2 * | 12/2009 | Kuwata | 375/371 |
| 2002/0084831 A1 * | 7/2002 | Brani | 327/536 |
| 2003/0038661 A1 | 2/2003 | Chokkalingam et al. | |
| 2007/0249309 A1 * | 10/2007 | Komiyama | 455/191.1 |
| 2010/0073049 A1 | 3/2010 | Tsai et al. | |
| 2011/0267141 A1 * | 11/2011 | Hangai et al. | 330/84 |

FOREIGN PATENT DOCUMENTS

| | | |
|---|---|---|
| CN | 1366377 A | 8/2002 |
| WO | WO 2007-038108 | 4/2007 |

OTHER PUBLICATIONS

International Search Report and Written Opinion of the International Searching Authority, issued on Feb. 28, 2013 in connection with corresponding PCT application no.: PCT/US2012/052863.

* cited by examiner

*Primary Examiner* — Nhan Le
(74) *Attorney, Agent, or Firm* — Knobbe Martens Olson & Bear LLP (57) ABSTRACT

Implementations of radio frequency switch controllers within the scope of the appended claims are configured to reduce the impact of the clock signal induced spurs. In particular, implementations of switch controllers described herein include a poly-phase clocking scheme, as opposed to a single phase to clock the charge pump stages of an negative voltage generator. In some implementations poly-phase clocking schemes reduce the clock signal induced spurs and may preclude the need for additional on-chip or off-chip decoupling capacitors that add to the cost and physical size of a complete front end module solution.

17 Claims, 8 Drawing Sheets

REDUCED CLOCK FEED-THROUGH SYSTEMS, METHODS AND APPARATUS

CROSS-REFERENCE TO RELATED APPLICATIONS

This application claims the benefit of priority under 35 U.S.C. §119(e) of U.S. Provisional Application No. 61/529,191 filed on Aug. 30, 2011, which is incorporated herein by reference in its entirety.

BACKGROUND

1. Field

Aspects of the present invention relate to electronic devices, and in particular, to systems, methods and apparatus configured to reduce clock feed-through in switches.

2. Background

Wireless communication systems are widely deployed to provide various types of communication content such as voice, data, and multimedia applications and services. These systems are typically configured to support communication with multiple users by sharing the available system resources, such as designated portions of frequency spectrum. The popularity of high data-rate wireless services is increasing the demand for access to available frequency spectrum. The ability to satisfy the demand is often limited by a lack of available frequency spectrum that may be shared for reliable communications within a geographic area.

Various multiple access techniques have been standardized over time to allow multiple users within a geographic area to share access to available frequency bands designated for wireless communication. Currently available user devices, such as smart phones and tablet computing devices, are capable of operating in multiple frequency bands. For example, 3 G cellular multimode, multiband devices can operate in three to four bands designated by 2.5 G EDGE/GSM standards and another three to four bands designated by the 3 G WCDMA/HSPA standards. In some deployments, 3GPP Long Term Evolution (LTE) and LTE-Advanced standards may support as many as eleven frequency bands.

The radio frequency (RF) switch is one of the many components that enable operation on multiple frequency bands. However, the often strict limits on peak transmission power of RF transmissions and the spurious effects caused by switching between multiple frequency bands present a number of challenges. In particular, conventional control of an RF switch can produce undesirable spurs (e.g. spurious tones) in the output signal of an RF switch. Uncorrected, these spurs may lead to violations of RF transmission regulations, which are set by various government agencies such as the U.S. Federal Communications Commission (FCC).

According to conventional solutions, clock spurs are reduced by including off-chip decoupling capacitors and large on-chip filtering networks. However, there are drawbacks to using these conventional solutions for reducing spurs. Off-chip decoupling capacitors add to the component count, cost and complexity of a device. They also occupy valuable substrate space, and thus limit the form factor of wireless devices. Large on-chip filtering networks occupy valuable chip space and can increase both electrical noise and the temperature of a chip during operation. Accordingly, there lies a challenge to reduce the impact of clock spurs caused by a switch controller used to enable switching between multiple frequency bands.

SUMMARY

Various embodiments of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how various features are employed to configure RF switch control systems, methods and apparatus that may have reduced clock feed-through characteristics.

One aspect of the disclosure is an apparatus configured to reduce control signal feed-through. In some implementations the apparatus includes a controllable electrical source including at least two sub-circuits, with each sub-circuit being configured to receive a respective control signal and draw from a supply in response to receiving the respective control signal. The apparatus further includes a control signal generator configured to provide at least two control signals separated by at least one non-zero phase difference. In some implementations the apparatus also includes a dither generator configured to dither at least one of the at least two control signals provided by the control signal generator.

In some implementations the controllable electrical source includes at least one of a voltage generator and a current generator. In one implementation the controllable electrical source includes a negative voltage generator. In some implementations, the negative voltage generator includes at least two charge-pumps, at least one of the charge-pumps providing an output of the negative voltage generator. In some implementations one or more of the at least two charge-pumps provides a respective output of the negative voltage generator.

In some implementations the apparatus also includes a filter connectable to at least one output of the negative voltage generator. In some implementations the filter includes a low pass filter provided to decrease the magnitude of an electrical spur induced by feed-through of at least one of the output signals of the control signal generator.

In some implementations the apparatus also includes a regulated supply. In some implementations, the regulated supply is connectable to a battery.

In some implementations the at least one phase difference is selected to increase the frequency of an electrical spur induced by feed-through of at least one of the output signals of the control signal generator. In some implementations the spur frequency is increased beyond the natural frequency roll-off of a system including the switch-controller. In some implementations the magnitude of the electrical spur is reduced at least in part as a function of the number of control signal phases received by the negative voltage generator.

Another aspect of the disclosure is a method of reducing clock feed-through in the combination of a switch and switch controller. In some implementations the method includes providing a controllable source including at least two sub-circuits, with each sub-circuit being configured to receive a respective control signal and draw from a supply in response to receiving the respective control signal. The method further includes providing a respective control signal to each of the respective at least two sub-circuits, and at least two of the control signals are characterized by a non-zero phase difference.

In some implementations the method also includes dithering at least one of the at least two control signals provided by the control signal generator. In some implementations the controllable electrical source includes at least one of a voltage generator and a current generator. In some implementations the controllable electrical source includes a negative voltage generator. In some implementations the negative voltage generator includes at least two charge-pumps, at least one of the charge-pumps providing an output of the negative voltage generator.

In some implementations the method also includes filtering at least one output of the negative voltage generator. In some implementations the filtering includes low pass filtering to decrease the magnitude of an electrical spur induced by feed-through of at least one of the output signals of the control signal generator.

In some implementations the method also includes drawing an output from one or more of the at least two charge-pumps of the negative voltage generator. In some implementations, the method also includes selecting the phase differences to increase the frequency of an electrical spur induced by feed-through of at least one of the output signals of the control signal generator. In some implementations the spur frequency is increased beyond the natural frequency roll-off of a system including a switch-controller. In some implementations the magnitude of the electrical spur is reduced at least in part as a function of the number of control signal phases received by the negative voltage generator.

Another aspect of the disclosure is an apparatus configured to reduce control signal feed-through to a radio frequency switch. In some implementations the apparatus includes means for delivering an electrical signal including at least two sub-circuits, each sub-circuit is configured to receive a respective control signal and draw from a supply in response to receiving the respective control signal; and means for generating control signals configured to provide at least two control signals separated by at least one non-zero phase difference.

In some implementations the apparatus also includes means for dithering at least one of the at least two control signals provided by the means for generating control signals.

In some implementations the means for delivering an electrical signal includes at least one of a voltage generator and a current generator. In some implementations the means for delivering an electrical signal includes a negative voltage generator. In some implementations the negative voltage generator includes at least two charge-pumps, at least one of the charge-pumps providing an output of the negative voltage generator. In some implementations the apparatus also includes means for filtering connectable to at least one output of the negative voltage generator. In some implementations the means for filtering includes a low pass filter provided to decrease the magnitude of an electrical spur induced by feed-through of at least one of the output signals of the means for generating control signals. In some implementations one or more of the at least two charge-pumps provides a respective output of the negative voltage generator.

In some implementations the at least one phase difference is selected to increase the frequency of an electrical spur induced by feed-through of at least one of the output signals of the means for generating control signals. In some implementations the spur frequency is increased beyond the natural frequency roll-off of a system including the switch-controller. In some implementations the magnitude of the electrical spur is reduced at least in part as a function of the number of charge-pumps included in the negative voltage generator.

Another aspect of the disclosure is a computer program product for reducing clock feed-through including a computer readable medium comprising instructions that when executed cause an apparatus to: provide a respective control signal to each of at least two sub-circuits included in a controllable electrical source, at least two of the control signals are characterized by a non-zero phase difference, and each of the at least two sub-circuits is configured to receive a respective control signal and draw from a supply in response to receiving the respective control signal.

In some implementations the computer program product also includes instructions that when executed cause an apparatus to dither at least one of the at least two control signals. In some implementations the controllable electrical source includes at least one of a voltage generator and a current generator.

In some implementations the controllable electrical source includes a negative voltage generator. In some implementations the negative voltage generator includes at least two charge-pumps, at least one of the charge-pumps providing an output of the negative voltage generator.

In some implementations the computer program product also includes instructions that when executed cause an apparatus to filter at least one output of the negative voltage generator. In some implementations filtering includes low pass filtering to decrease the magnitude of an electrical spur induced by feed-through of at least one of the output signals of the control signal generator. In some implementations the computer program product also includes instructions that when executed cause an apparatus to draw an output from one or more of the at least two charge-pumps of the negative voltage generator.

In some implementations the computer program product also includes instructions that when executed cause an apparatus to select the phase differences to increase the frequency of an electrical spur induced by feed-through of at least one of the control signals. In some implementations the spur frequency is increased beyond the natural frequency roll-off of a system including the switch-controller. In some implementations the magnitude of the electrical spur is reduced at least in part as a function of the number of control signal phases received by the negative voltage generator.

Another aspect of the disclosure relates to a wireless device. In some implementations the wireless device includes a transceiver and one or more front-end modules connected to the transceiver and configured to facilitate processing of radio-frequency (RF) signals corresponding to multi-modes of operation. The wireless device further includes an antenna configured to facilitate transmission and reception of the RF signals. The wireless device further includes an RF switch configured to route the RF signals between the antenna and the one or more front-end modules based on respective modes of operation. The wireless device further includes a switch controller configured to control the RF switch. The switch controller includes a controllable electrical source having at least two sub-circuits, with each sub-circuit being configured to receive a respective control signal and draw from a supply in response to receiving the respective control signal. The switch controller further includes a control signal generator configured to provide at least two control signals separated by at least one non-zero phase difference.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

In accordance with common practice the various features illustrated in the drawings may not be drawn to scale. Accordingly, the dimensions of the various features may be arbitrarily expanded or reduced for clarity. In addition, some of the drawings may not depict some of the components of a given system, method or device. Finally, like reference numerals may be used to denote like features throughout the specification and figures.

DETAILED DESCRIPTION

Various aspects of implementations within the scope of the appended claims are described below. The aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The implementations described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM (Global System for Mobile Communications) or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution), LTE-Advanced or any other standards and/or ad hoc wireless techniques known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. Moreover, as used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), a smart phone, a tablet computing device or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

In some aspects the teachings herein may be employed in a network that includes macro scale coverage (e.g., a large area cellular network such as a 3 G or 4 G network, typically referred to as a macro cell network) and smaller scale coverage (e.g., a residence-based or building-based network environment). As an AT or UE moves through such a network, the access terminal may be served in certain locations by ANs that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

Various multiple access techniques have been contemplated and some standardized to allow multiple users within a geographic area to share access to available frequency bands designated for wireless communication. Currently available user devices, such as smart phones and tablet computing devices, are capable of operating in multiple frequency bands. For example, 3 G cellular multimode, multiband devices can operate in three to four bands designated by 2.5 G EDGE/GSM standards and an additional three to four bands designated by the 3 G WCDMA/HSPA standards. In some deployments, 3GPP Long Term Evolution (LTE) and LTE-Advanced standards may support as many as eleven frequency bands.

Figure 1:
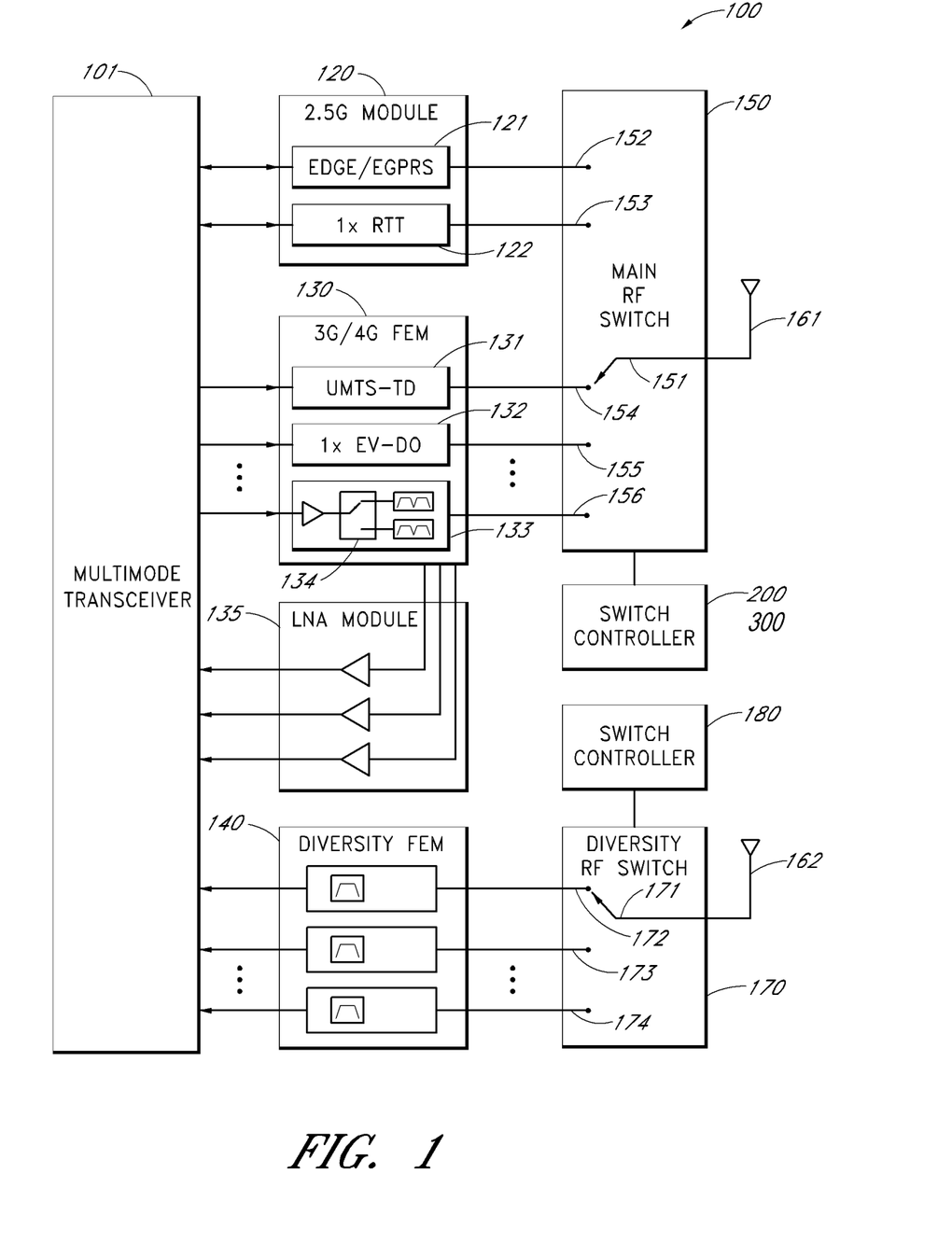
FIG. 1 is a schematic diagram of a portion of a wireless device.

As noted above, the RF (radio frequency) switch is one of the many components that facilitate operation on multiple frequency bands. To that end, RF switches in various forms are often utilized throughout the radio front-end of a wireless device. For example, FIG. 1 is a schematic diagram showing some of the radio front-end components of a wireless device 100, including several RF switches. Those skilled in the art will appreciate that a wireless device may include fewer, more and/or different components than are illustrated in FIG. 1, and that FIG. 1 merely includes some example radio components to facilitate the discussion of aspects of the example implementations disclosed herein.

The portion of the device 100 illustrated in FIG. 1 includes a multimode transceiver 101, a 2.5 G front-end module (FEM) 120, a 3 G/4 G FEM 130, a corresponding low noise amplifier (LNA) module 135, a diversity FEM 140, a main RF switch 150, a corresponding switch controller 200, a diversity RF switch 170, a corresponding switch controller 180, and first and second antennas 161, 162.

The multimode transceiver 101 is coupled to the 2.5 G FEM 120, the 3 G/4 G FEM 130, the LNA module 135 and the diversity FEM 140. For the sake of simplifying the description herein, the multimode transceiver 101 includes what those skilled in the art would consider the radio back-end or baseband and intermediate frequency (IF) components. Baseband and IF components typically implement functions such as, but not limited to, voice-to-data encoding, packet forming and framing of data, forward error correction, pulse shaping, etc. Those skilled in the art will appreciate from the present description that various baseband and IF functions are often implemented in various wireless devices, and that a more detailed description of those functions has been omitted for the sake of brevity.

As illustrated in FIG. 1, the 2.5 G FEM 120 is a multiband FEM. To that end, for example only, the 2.5 G FEM 120 includes an EDGE/EGPRS (Enhanced Data Rate GSM Evolution/Enhanced General Packet Radio Service) FEM 121 and a 1xRTT FEM 122. Those skilled in the art will appreciate from the present disclosure that EDGE/EGPRS and 1xRTT are second-and-a-half (i.e. 2.5 G) generation FEMs that are designed and licensed to operate on separate frequency bands. Moreover, those skilled in the art will also recognize that 1xRTT is an implementation of CDMA.

Similarly, the 3 G/4 G FEM 130 is also a multiband FEM. As illustrated in FIG. 1, the 3 G/4 G FEM 130 includes, for example only, a UMTS-TD (Universal Mobile Telecommunications System-Time Division) FEM 131, a 1xEV-DO (Evolution-Data Optimized CDMA) FEM 132 and an LTE-Advanced FEM 133. The corresponding LNA module 135 provides respective receiver-side low noise amplifiers for the UMTS-TD FEM 131, NEV-DO FEM 132 and LTE-Advanced FEM 133. Those skilled in the art will appreciate from the present disclosure that UMTS-TD and 1xEv-DO are third generation FEMs that are designed and licensed to operate on separate frequency bands. Those skilled in the art will also appreciate that LTE-Advanced is sometimes referred to as a fourth generation wireless standard (i.e. 4 G). As described in greater detail below, the LTE-Advanced FEM 133 includes a band-mode switch 134 to enable frequency band switching within the portion of the frequency spectrum designated for LTE-Advanced systems and communication.

The main RF switch 150 selectively couples the first antenna 161 to the various outputs of the 2.5 G FEM 120, the 3 G/4 G FEM 130, and the LNA module 135. Accordingly, the main RF switch 150 includes five respective input throws (or contacts) 152, 153, 154, 155, 156, and a pole 151 that can be selectively coupled between the first antenna 161 and one of the five respective input throws 152, 153, 154, 155, 156.

With further reference to the main RF switch 150, the first throw (or input contact) 152 is connectable to receive the output of the EDGE/EGPRS FEM 121. The second throw 153 is connectable to receive the output of the 1xRTT FEM 122. The third throw 154 is connectable to receive the output of the UMTS-TD FEM 131. The fourth throw 155 is connectable to receive the output of the NEV-DO FEM 133. The fifth throw 156 is connectable to receive the output of the LTE-Advanced FEM 133. The first switch controller 200 provides control signals to the main RF switch 150 to selectively couple the pole 151 to one of the five respective input throws 152, 153, 154, 155, 156.

The diversity RF switch 170 selectively couples the second antenna 162 to the various outputs of the diversity FEM 140. The diversity FEM 140 includes parallel duplicate LNAs (not specifically labeled) corresponding to LNAs in the LNA module 135, in order to enable multiple-output spatial diversity processing by the wireless device 100. To that end the diversity RF switch 170 includes three respective input throws (or contacts) 172, 173, 174, and a pole 171 that can be selectively coupled between the second antenna 162 and one of the three respective input throws 172, 173, 174. The second switch controller 180 provides control signals to the diversity RF switch 170 to selectively couple the pole 171 to one of the three respective input throws 172, 173, 174.

Diversity techniques are used to increase data rates and resilience against adverse channel conditions. For complexity, cost and power consumption considerations, diversity techniques are often only applied on the receiver side of a mobile wireless device. The power-handling requirements for the diversity RF switch 170 are often less than the requirements for the primary path antenna switch 150 because spatial diversity techniques are typically not used when received signals are relatively high.

The main RF switch 150 illustrated in FIG. 1 is referred to as a single-pole-five-throw switch. The diversity RF switch 170 illustrated in FIG. 1 is referred to as a single-pole-triple-throw switch. Similarly, the band-mode switch 134 is referred to as a single-pole-double-throw switch. While the three aforementioned specific configurations of RF switches are illustrated in FIG. 1, those skilled in the art will appreciate that there are numerous configurations for RF switches that may be employed within a wireless device. For example, RF switch configurations in smart phones range from relatively simple, single-pole, double-throw (SPDT) configurations through to more complex single-pole, ten-throw (SP10T) configurations and sometimes have even higher throw counts.

In operation, the primary function of the main RF switch 150 is to connect RF radio transmissions from the 2.5 G FEMs 121, 122 and the 3 G/4 G FEMs 131, 132, 133 to the first antenna 161. Implementations of the main RF switch 150, sometimes referred to as an antenna switch, range anywhere from the single-pole, seven-throw (SP1T) through single-pole, ten-throw (SP10T) configurations, depending upon the number of RF bands supported by a particular smart phone. The main RF switch 150 is also tasked to maintain the signal linearity and to provide isolation between transmit and receive chains, with the lowest insertion loss possible. The transition to wireless data communications as opposed to previous generations of voice only use, have stimulated a movement towards the use of higher-order modulation schemes such as OFDM and OFDMA. These complex modulation schemes yield waveforms that vary widely in amplitude, resulting in high peak-to-average-power-ratio (PAPR) signals that demand increased dynamic range from the components that relay and process the signals and require relatively high linearity from the main RF switch 150 in order to minimize distortion within the RF signal path.

As described in further detail below with reference to FIG. 2 and FIG. 3, the switch controller 200 is utilized to enable satisfactory RF isolation between the throws of the main RF switch 150. For example, to maintain linearity in the face of increasingly higher power signals, most antenna switches feature increasingly sophisticated design topologies to meet increasingly stringent linearity requirements. Often there are integrated charge pumps in the antenna switch controller 200, which are used to boost the battery voltage to control the field-effect transistors (FETs) included in the switch. This implementation is often a reasonable power versus performance tradeoff, since the multiple charge-pumps improve switch insertion loss and isolation, and enhance the robustness of the compression point. Those skilled in the art will appreciate that the compression point of an RF electronic device may be defined by the output-power point at which gain is compressed by 0.1 dB (P0.1 dB) or by 1 dB (P1 dB). However, alternative definitions may also apply.

Figure 2:
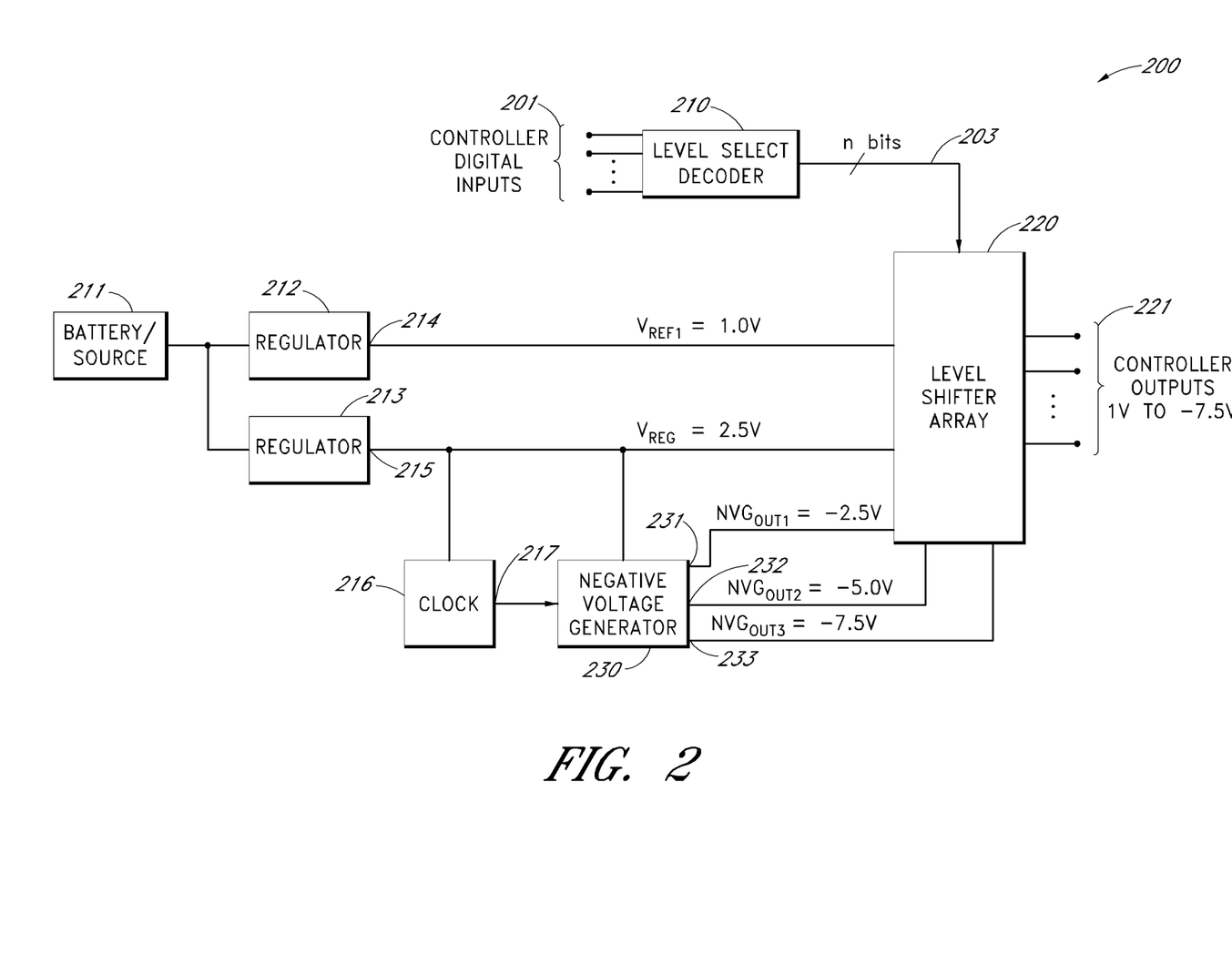
FIG. 2 is a schematic diagram of a conventional RF switch controller.

FIG. 2 is a schematic diagram of an implementation of the RF switch controller 200 illustrated schematically in FIG. 1. Those skilled in the art will appreciate that a RF switch controller may include fewer, more and/or different components than are illustrated in FIG. 2, and that FIG. 2 merely includes some of the more pertinent components to facilitate the discussion of aspects of example implementations disclosed herein.

The switch controller 200 is configured to provide control signal levels on the order of +1 V (to enable a path) and −7.5 V (to disable a path) in order to achieve a satisfactory RF isolation level between throws 152, 153, 154, 155, 156, and to improve the harmonic performance of the main RF switch 150. To that end, the switch controller 200 includes a level select decoder 210, a level shifter array 220, a negative voltage generator (NVG) 230, a clock source 216, a battery 211, and first and second regulators 212, 213.

The battery 211 is coupled to provide respective voltage level inputs to the first and second regulators 212, 213. The output of the first regulator 212 is provided from port 214 and, for example, is +1.0 V. The output of the second regulator 213 is provided from port 215 and, for example, is +2.5 V. The respective output ports 214, 215 of the first and second regulators 212, 213 are connectable to the level shifter array 220. The output port 215 of the second regulator 213 is also provided to the clock 216 and the NVG 230 as an input. The output port 217 of the clock 216 is provided to the NVG 230 as a control input. The NVG 230 includes first, second and third output ports 231, 232, 233, which are connectable to the level shifter array 220 to deliver input voltage levels to the level shifter array 220. As illustrated in FIG. 2, the input voltage levels provided by the NVG 230 include −2.5 V, −5.0 V and −7.5 V. In total, the level shifter array 220 receives five voltage level inputs at +1.0 V, +2.5 V, −2.5 V, −5.0 V and −7.5 V. The level select decoder 210 includes digital control inputs 201 and an n-bit control signal output 203. The n-bit control signal output 203 is provided to the level shifter array 220, which selectively provides voltage levels, ranging from +1.0 V to −7.5 V, to the main RF switch 150 of FIG. 1.

A typical NVG in a switch controller design uses three or four charge pump stages, connected in series, to yield a negative on-chip voltage that is three or four times that of the regulated supply voltage. To accomplish this goal, an on-chip oscillator is used to clock the charge pump stages at a frequency Fclk. FIG. 3 is a schematic diagram of the NVG 230 and the clock 216 included in the RF switch controller 200 of FIG. 2. Those skilled in the art will appreciate that a negative voltage generator may include fewer, more and/or different components than are illustrated in FIG. 3, and that FIG. 3 merely includes some of the more pertinent components to facilitate the discussion of aspects of example implementations disclosed herein.

Figure 3:
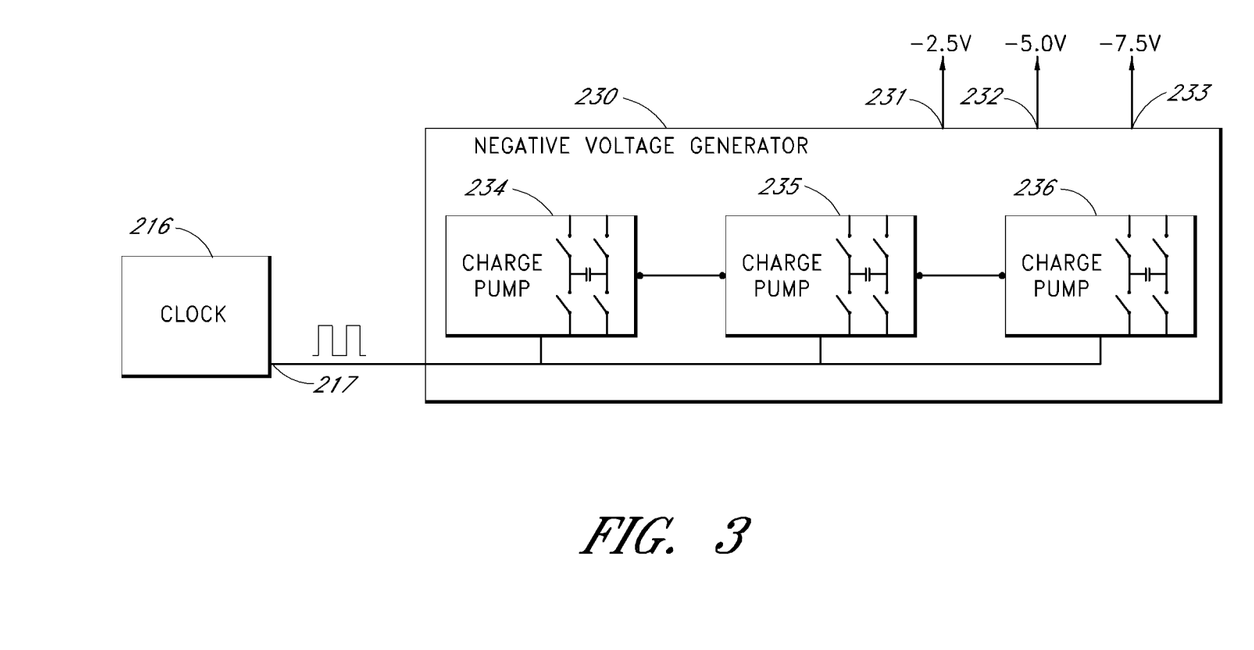
FIG. 3 is a schematic diagram of a negative voltage generator included in the RF switch controller of FIG. 2.

The NVG 230 may include first, second and third charge pumps 234, 235, 236 coupled in series as depicted in FIG. 3. The first, second, and third outputs 231, 232, 233 are tapped from the outputs of the first, second and third charge pumps 234, 235, 236, respectively. The single clock output 217 is provided to each of the charge pumps 234, 235, 236. In operation, the charge pumps 234, 235, 236 draw from the second regulated supply 213 simultaneously, with a frequency of Fclk, because each of the charge pumps is activated by the same edge(s) of the clock signal. In turn, the clock signal contributes clock feed-through spurs at the controller output 221, and eventually the RF switch output coupled to the first antenna 161, at offsets of approximately Fc+Fclk, Fc+2*Fclk, Fc+3*Fclk, . . . , where Fc is the carrier frequency of the RF signal transmitted by the wireless device 100.

There are multiple feedback and feed-through mechanisms that contribute to the electrical spurs. For example, one mechanism includes the finite reverse isolation of the on-chip regulators 212, 213 that separates the supply voltage of the NVG 230 from the battery 211 that is used to power the switch 200. Another mechanism includes the finite isolation from the control inputs of the switch to the RF output of the switch, etc.

According to conventional solutions, clock spurs are reduced by including off-chip decoupling capacitors and large on-chip filtering networks. However, there are drawbacks to using these conventional solutions for reducing spurs. Off-chip decoupling capacitors add to the component count, cost and complexity of a device. They also occupy valuable substrate space, and thus limit the form factor of wireless devices. Large on-chip filtering networks occupy valuable chip space and can increase both electrical noise and the temperature of a chip during operation. Accordingly, there lies a challenge to reduce the impact of clock spurs caused by a switch controller used to enable switching between multiple frequency bands.

By contrast, implementations of RF switch controllers within the scope of the appended claims are configured to reduce the clock signal induced spurs. In particular, implementations of switch controllers described herein include a poly-phase (i.e. "multi-phase") clocking scheme, as opposed to a single phase scheme to clock the charge pump stages of an NVG. In some implementations poly-phase clocking schemes reduce the clock signal induced spurs and may preclude the need for additional off-chip decoupling capacitors that add to cost and module substrate area for a complete FEM solution.

In some implementations the poly-phase approach may be beneficial in two regards. First, clocking the individual stages of an NVG at different phases may result in each stage drawing current from a regulated supply at different points in time. Thus the momentary droop on the supply that results increases in frequency which has the net effect of pushing out the dominant spur by a multiplicative factor of approximately N times the clock frequency. That is, in some implementations the number of clock phases provides a frequency multiplier. Pushing out the frequency of the dominant spur, Fsp, may be beneficial because the natural frequency response (roll-off) of the system attenuates spur levels at higher frequency offsets, and as a spur at Fc+Fsp will also have higher harmonically related spurs at Fc+2*Fsp, Fc+3*Fsp and so on. In other words, in some implementations, the higher the frequency of the dominant spur the lower the number of feedthrough spurs that may pose a problem due to the attenuation at higher offsets that results from the natural roll-off of the system. Second, by clocking each of the charge pump stages of an NVG at different phases, and therefore different instances in time, the amplitude of the dip imposed on the regulated supply, and thus a battery feeding the supply, may be smaller because only one stage is drawing current while being switched on at a time. Subsequently, the amplitude of the fundamental spur itself may be reduced by as much as a factor of two or more depending on the number of clock phases provided to the NVG. Again, the number of clock phases used may be a good first order approximation for the factor by which attenuation of the spurs may be improved, assuming even loading.

Figure 4:
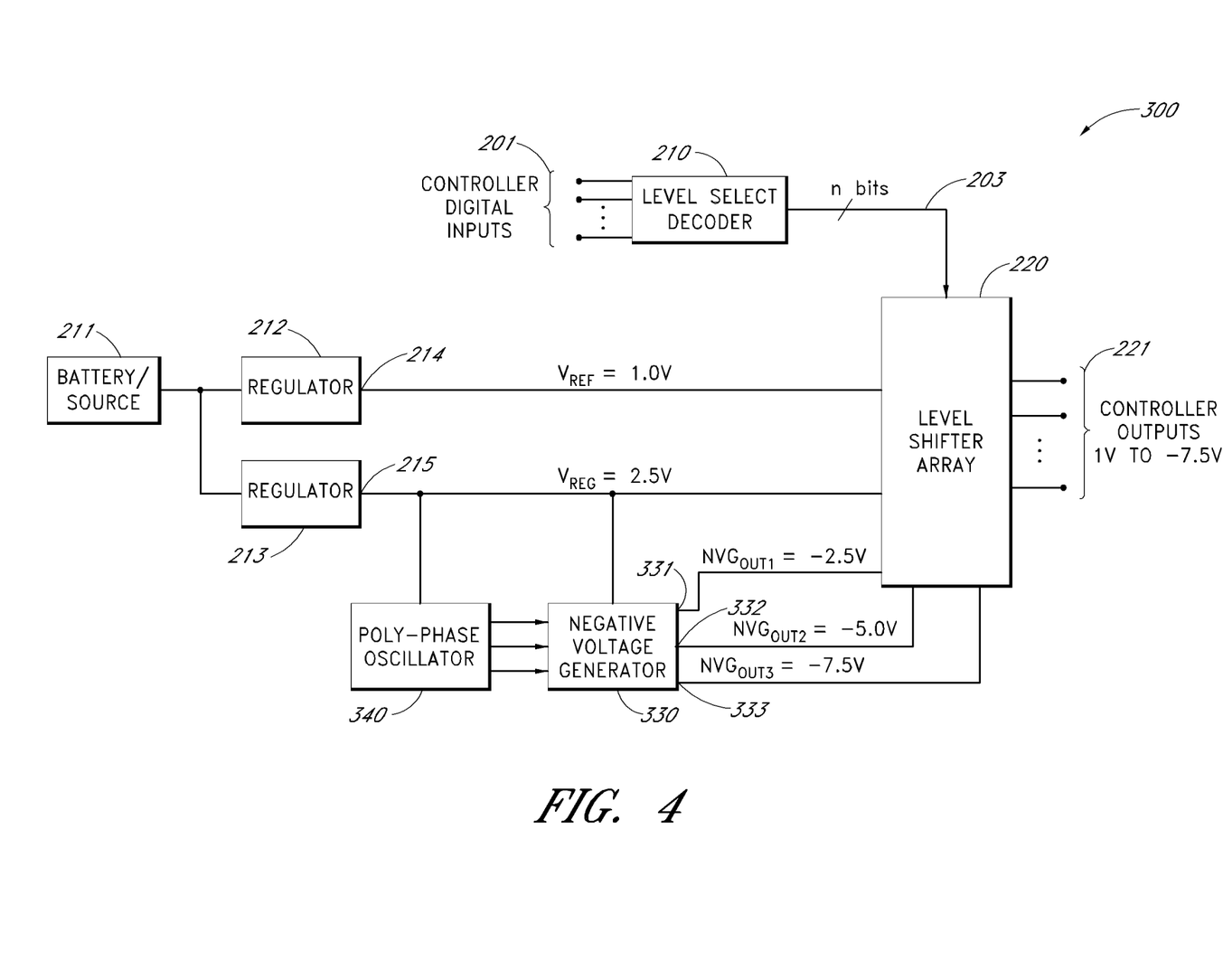
FIG. 4 is a schematic diagram of an implementation of an RF switch controller.

FIG. 4 is a schematic diagram of an implementation of an RF switch controller 300. In some embodiments, one or more features of the RF switch controller 300 of FIG. 4 can be implemented in the RF switch controller 300 illustrated schematically in FIG. 1. Those skilled in the art will appreciate that an RF switch controller may include fewer, more and/or different components than those illustrated in FIG. 4, and that FIG. 4 merely includes some of the more pertinent components of the example implementation disclosed herein. The RF switch controller 300 illustrated in FIG. 4 is adapted from the conventional RF switch controller 200 of FIG. 2 to reduce the impact of undesirable spurs (e.g. spurious tones) in the output signal of the RF controller during operation. Elements common to both implementations share common reference indicia, and only differences between the controllers 200, 300 are described herein for the sake of brevity.

In particular, the RF switch controller 300 includes a poly-phase oscillator 340 instead of a single phase clock. In some implementations the poly-phase oscillator 340 includes a control signal generator configured to provide at least two control signals separated by at least one non-zero phase difference. The RF switch controller 300 also includes a modified NVG 330 that is configured to receive at least two control signals separate by at least one non-zero phase difference. In some implementations the modified NVG 330 includes a controllable electrical source including at least two sub-circuits, each sub-circuit is configured to receive a respective control signal and draw from a supply in response to receiving the respective control signal. As illustrated in FIG. 4, the NVG 330 is configured to receive three control signals from the poly-phase oscillator 340, each of which is provided to a respective charge pump forming the NVG 330.

Figure 5:
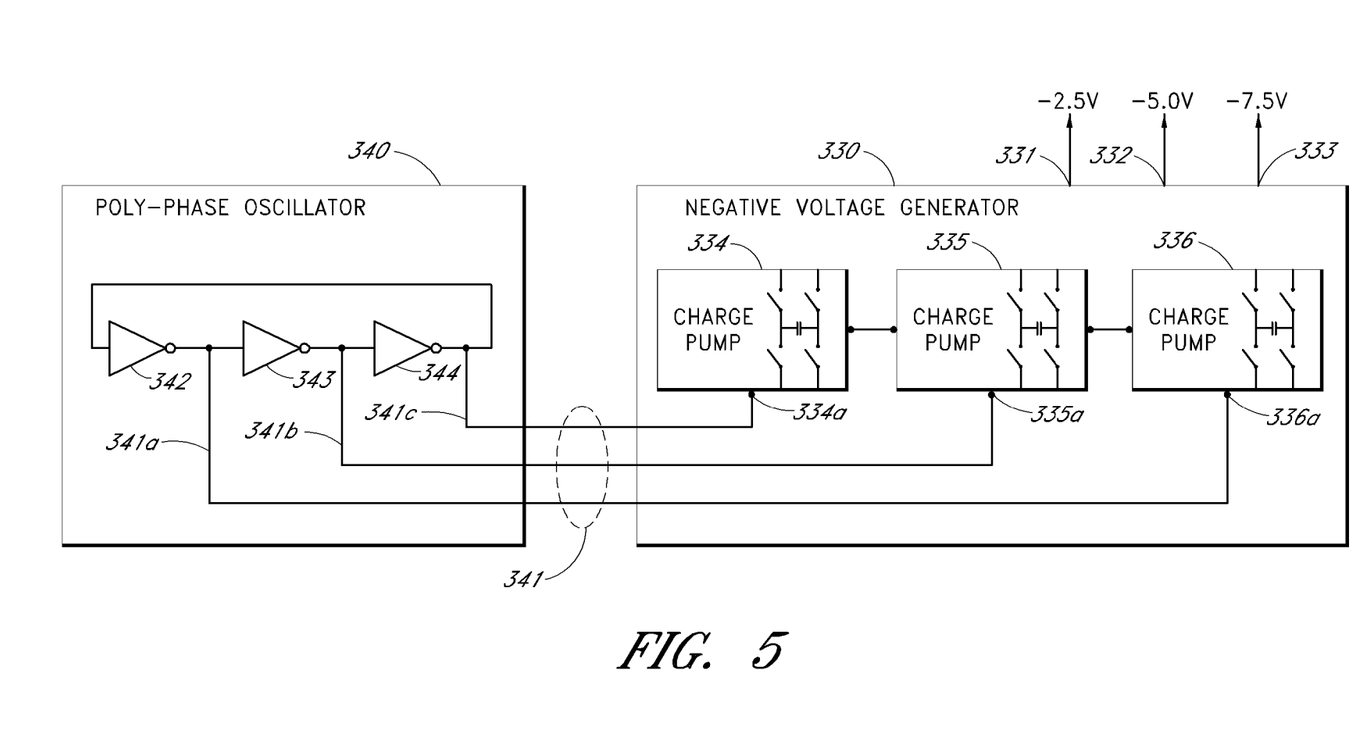
FIG. 5 is a schematic diagram of an implementation of a poly-phase oscillator and modified negative voltage generator included in the RF switch controller of FIG. 4.

FIG. 5 is a schematic diagram of an implementation of the poly-phase oscillator 340 and the modified negative voltage generator 330 included in the RF switch controller 300 of FIG. 4. The poly-phase oscillator 340 includes a ring oscillator having three stages 342, 343, 344. While a three stage ring oscillator is illustrated in FIG. 5, those skilled in the art will appreciate from the present disclosure that a ring oscillator having any number of stages may be used in various implementations within the scope of the appended claims. The three stage ring oscillator schematically illustrated is merely provided to facilitate a convenient description of various aspects of an example implementation. Each stage 342, 343, 344 serves as a delay element. In some implementations the delays between stages are approximately the same, whereas in other implementations the delays between two stages may vary from one pair of stages to the next. Each stage 342, 343, 344 also provides a respective output 341a, 341b, 341c. The control signals on the three respective outputs 341a, 341b, 341c are delayed with respect to one another, and thus are out-of-phase with respect to one another.

The NVG 330 of FIG. 5 includes first, second and third charge pumps 334, 335, 336 coupled in series. In some implementations only some of the charge pumps are tapped for outputs of the NVG 330. In some implementations the output of each charge pump can be used as an output of the NVG 330. For example, the first, second, and third outputs 331, 332, 333 can be tapped from the outputs of the first, second and third charge pumps 334, 335, 336, respectively. Unlike the NVG 230 of FIG. 2, the charge pumps 334, 335, 336 of the modified NVG 330 of FIG. 5 are configured to receive separate control signals on respective ports 334a, 335a, 336a. Accordingly, in operation, the poly-phase control signals from ports 341a, 341b, 341c are coupled to ports 334a, 335a, 336a. Consequently, the charge pumps 334, 335, 336 operate substantially out-of-phase with respect to one another as described above.

Figure 6:
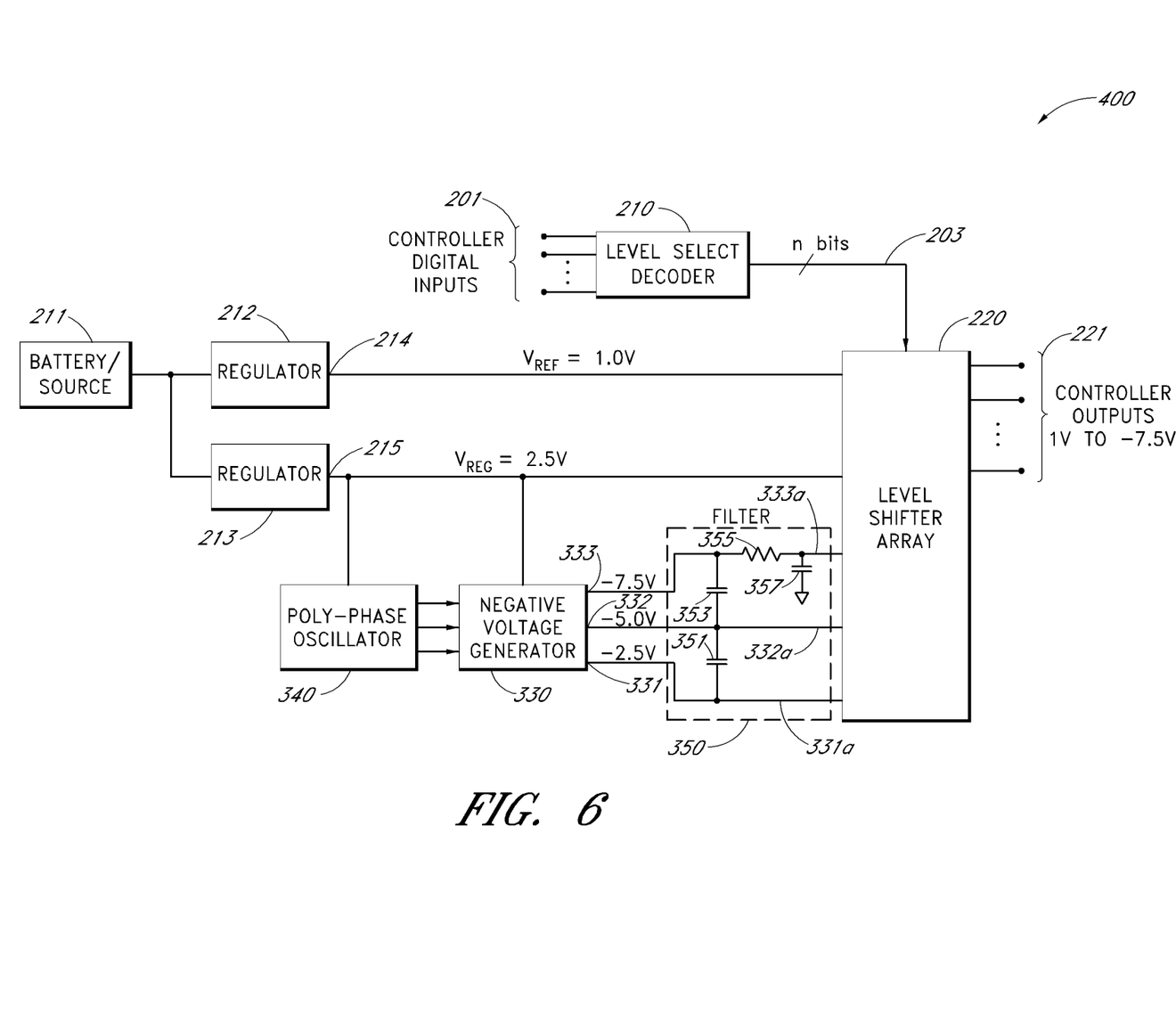
FIG. 6 is a schematic diagram of another implementation of an RF switch controller.

FIG. 6 is a schematic diagram of another implementation of an RF switch controller 400. Those skilled in the art will appreciate that a RF switch controller may include fewer, more and/or different components than are illustrated in FIG. 6, and that FIG. 6 merely includes some of the more pertinent components of the example implementation disclosed herein. The RF switch controller 400 illustrated in FIG. 6 is similar to and adapted from the RF switch controller 300 of FIG. 4. Elements common to both share common reference indicia, and only differences between the controllers 300, 400 are described herein for the sake of brevity.

In particular, the RF switch controller 400 of FIG. 6 includes a filter 350 coupled between the three outputs 331, 332, 333 of the NVG 330 and the level shift array 220. The filter 350 includes first, second and third capacitors 351, 353, 357 and a resistor 355. The first capacitor 351 is coupled between the first and second outputs 331, 332 of the NVG 330. The second 353 is coupled between the second and third outputs 332, 333 of the NVG 330. The resistor 355 is coupled in series between one terminal of the second capacitor 353 and the level shifter array 220 at node 333a. The third capacitor 357 is coupled between node 333a and ground.

In operation, the filter 350 operates to further attenuate clock feed-through induced spurs, as well as to isolate the output voltage levels provided on outputs 331, 332, 333 of the NVG 330. However, due to the poly-phase clocking scheme, the attenuation provided by the filter 350 can be made less than what it would otherwise be if a conventional single-phase clocking scheme was employed. Accordingly, in some implementations, the capacitors 351, 353 and 357 can be relatively small and thus implemented on-chip without occupying large die area.

In some implementations, it is not possible to tolerate resistor 355 due to the voltage drop that results. Nevertheless, in such implementations, the three capacitors 351, 353 and 357 may provide enough attenuation, since the attenuation provided by the filter 350 merely supplements the attenuation achieved by the poly-phase clocking scheme.

Figure 7:
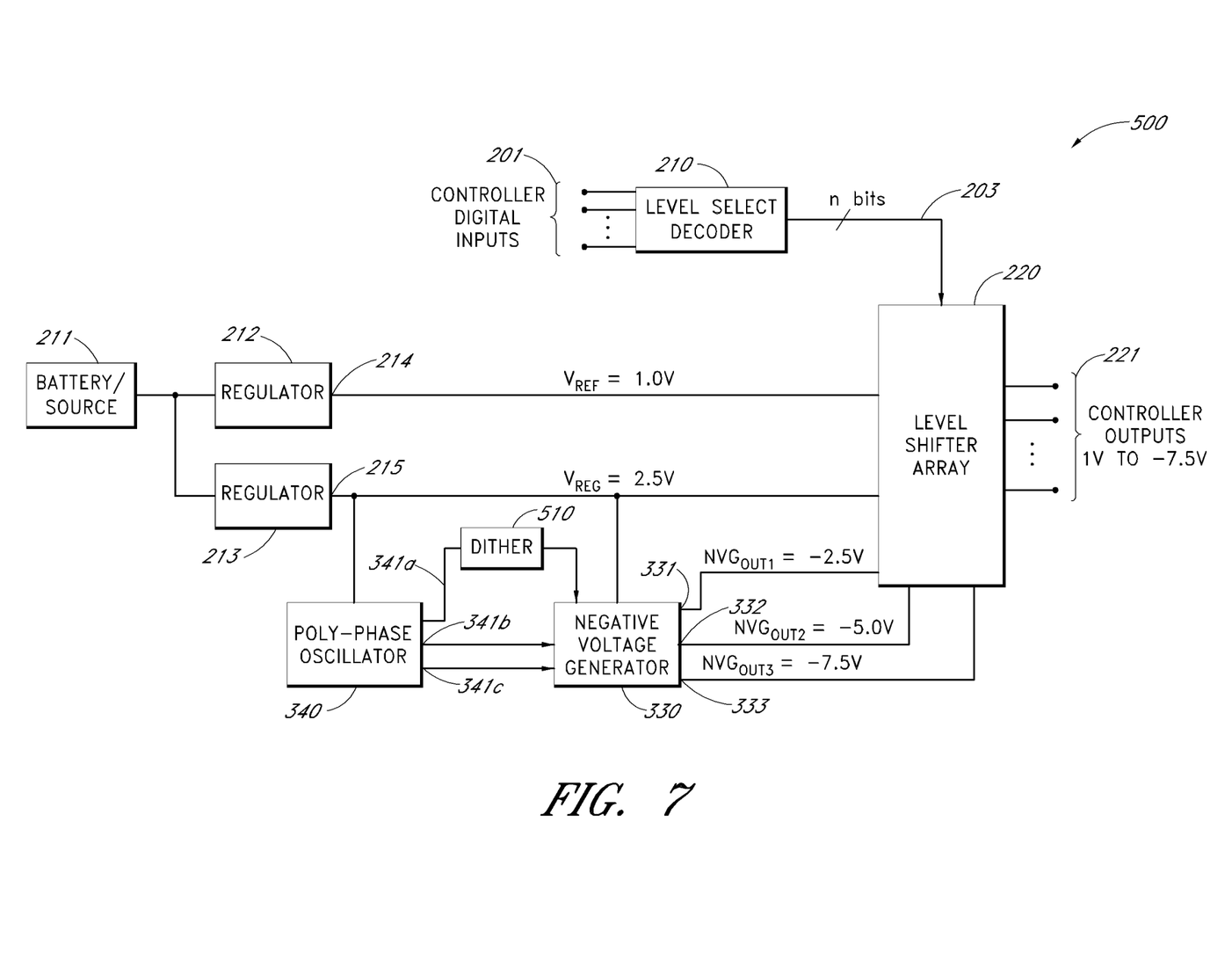
FIG. 7 is a schematic diagram of another implementation of an RF switch controller.

FIG. 7 is a schematic diagram of another implementation of an RF switch controller 500. Those skilled in the art will appreciate that an RF switch controller may include fewer, more and/or different components than are illustrated in FIG. 7, and that FIG. 7 merely includes some of the more pertinent components of the example implementation disclosed herein. The RF switch controller 500 illustrated in FIG. 7 is adapted from the RF switch controller 300 of FIG. 4. Elements common to both implementations share common reference indicia, and only differences between the controllers 300, 500 are described herein for the sake of brevity.

As compared to the RF switch controller 300 of FIG. 4, the RF switch controller 500 includes a dither generator 510 coupled in series between the first output 341a of the poly-phase oscillator 340 and the corresponding charge pump input of the NVG 330. In some implementations, the dither generator 510 provides an intentionally applied form of pseudo-random or periodic phase noise to further vary the times at which the charge pumps of the NVG 330 are activated relative to one another. In some implementations, the dither generator 510 applies low-level frequency modulation to one or more outputs of the poly-phase oscillator 340 for a similar effect.

Figure 8:
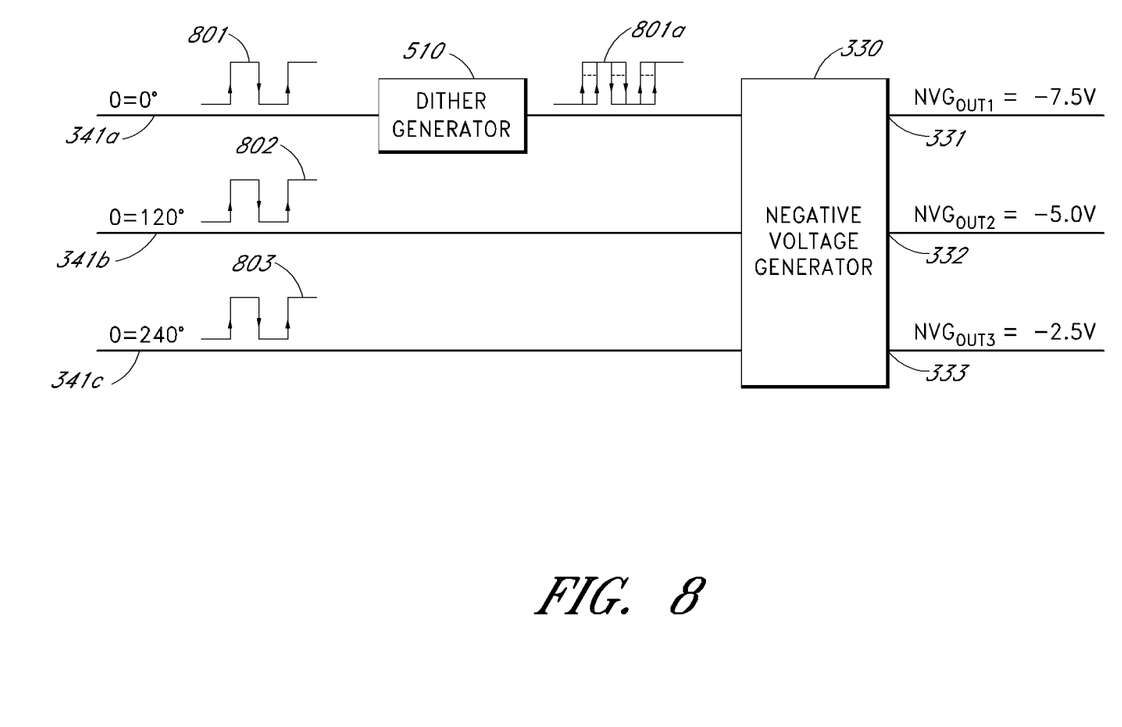
FIG. 8 is a schematic diagram of an implementation of the dither generator in combination with the negative voltage generator of FIG. 7.

FIG. 8 is a schematic diagram of an implementation of the dither generator 510 in combination with the negative voltage generator 330 of FIG. 7. For the sake of example only, initially, the signals 801, 802, 803 provided from the poly-phase oscillator outputs 341a, 341b, 341c have corresponding phases of 0°, 120° and 240°. In operation, the dither generator 510 varies the signal edges of the first signal 801 to produce a dithered signal 801a. The phase of the signal 801a varies relative to the phases of the second and third signals 802, 803. In some implementations, the result is a further reduction of the clock feed-through induced spurs. Moreover, while the dithering is applied to one of the poly-phase oscillator outputs in the system shown in FIG. 7 and FIG. 8, those skilled in the art will appreciate that dithering can be applied to any number of poly-phase oscillator outputs in order to vary the outputs in time with respect to one another.

Numerous inventive principles have been described above, and each has independent utility. In some cases, additional benefits and advantages are realized when the principles are utilized in various combinations with one another. For example, various implementations of RF switch controllers have been described above. Elements of these implementations may be combined with any number of wireless devices, including but not limited to, smart-phones and tablet computing devices. Accordingly, such wireless devices may be implemented according to the principles and advantages described herein.

For example, some implementations include a method of reducing clock feed-through in the combination of a switch and switch controller. In some implementations the method includes providing a controllable source including at least two sub-circuits, each sub-circuit is configured to receive a respective control signal and draw from a supply in response to receiving the respective control signal, and also providing a respective control signal to each of the respective at least two sub-circuits, and at least two of the control signals are characterized by a non-zero phase difference. In some implementations, the method also includes dithering at least one of the at least two control signals provided by the control signal generator.

In another example, some implementations include a computer program product for reducing clock feed-through including a computer readable medium comprising instructions that when executed cause an apparatus to provide a respective control signal to each of at least two sub-circuits included in a controllable electrical source, at least two of the control signals are characterized by a non-zero phase difference, and each of the at least two sub-circuits is configured to receive a respective control signal and draw from a supply in response to receiving the respective control signal. In some implementations, the computer program product also includes instructions that when executed cause an apparatus to dither at least one of the at least two control signals.

Some of the implementations disclosed herein have been described with specific signals implemented as current-mode or voltage-mode signals, but the inventive principles also contemplate other types of signals, whether characterized as voltages or currents. Likewise, some semiconductor devices include NPN or PNP BJTs (bipolar junction transistors), but in many cases different polarities or different device types such as J-FETs, CMOS or GASFET transistors can also be utilized.

Moreover, the foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment, assuming that the functionality of the depicted circuits is not substantially adversely affected.

Moreover, switch control schemes employing the above described configurations can be implemented into various electronic devices or integrated circuits. Examples of the electronic devices can include, but are not limited to, consumer electronic products, parts of the consumer electronic products, electronic test equipments, etc. Examples of the electronic devices can also include memory chips, memory modules, circuits of optical networks or other communication networks, and disk driver circuits. The consumer electronic products can include, but are not limited to, a mobile phone, cellular base stations, a telephone, a television, a computer monitor, a computer, a hand-held computer, a personal digital assistant (PDA), a stereo system, a cassette recorder or player, a DVD player, a CD player, a VCR, an MP3 player, a radio, a camcorder, a camera, a digital camera, a portable memory chip, a copier, a facsimile machine, a scanner, a multi functional peripheral device, a wrist watch, a clock, etc. Further, the electronic device can include unfinished products.

Thus, the embodiments described herein can be modified in arrangement and detail without departing from the scope of the appended claims. So although specific embodiments have been described, other embodiments will be apparent to those of ordinary skill in the art from the disclosure herein. For example, a skilled artisan will recognize from the disclosure herein that various methods of manufacture, design, and materials can be used to make the various components described herein. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and sub-combinations of the features and aspects can be made and still fall within the scope of the invention. Furthermore, the systems described above need not include all of the modules and functions described in the preferred embodiments. Accordingly, the present invention is not intended to be limited by the recitation of the specific embodiments described above, but is to be defined by reference to the appended claims.

What is claimed is:

1. An apparatus comprising:
a controllable electrical source including at least two sub-circuits, each sub-circuit configured to receive a respective control signal and draw from a supply in response to receiving the respective control signal; and
a control signal generator configured to provide at least two control signals separated by at least one non-zero phase difference; and
a dither generator configured to dither at least one of the at least two control signals provided by the control signal generator.

2. The apparatus of claim 1 wherein the controllable electrical source includes at least one of a voltage generator and a current generator.

3. The apparatus of claim 1 wherein the controllable electrical source includes a negative voltage generator.

4. The apparatus of claim 3 wherein the negative voltage generator includes at least two charge-pumps, at least one of the charge-pumps providing an output of the negative voltage generator.

5. The apparatus of claim 4 wherein one or more of the at least two charge-pumps provides a respective output of the negative voltage generator.

6. The apparatus of claim 3 wherein the supply includes a regulated supply.

7. The apparatus of claim 6 wherein the regulated supply is connectable to a battery.

8. The apparatus of claim 1 wherein the at least one non-zero phase difference is selected to increase the frequency of an electrical spur induced by feed-through of at least one of the output signals of the control signal generator.

9. The apparatus of claim 8 wherein the spur frequency is increased beyond the natural frequency roll-off of a system including the apparatus.

10. The apparatus of claim 8 wherein the magnitude of the electrical spur is reduced at least in part as a function of the number of control signal phases received by the controllable electrical source.

11. The apparatus of claim 1 wherein the apparatus is included on a radio-frequency (RF) wireless device within a switch controller that is configured to control an RF switch of the RF wireless device.

12. An comprising:
a controllable electrical source including at least two sub-circuits and a negative voltage generator, each sub-circuit configured to receive a respective control signal and draw from a supply in response to receiving the respective control signal, the negative voltage generator including at least two charge-pumps, at least one of the charge-pumps providing an output of the negative voltage generator;
a control signal generator configured to provide at least two control signals separated by at least one non-zero phase difference; and
a filter connectable to at least one output of the negative voltage generator.

13. The apparatus of claim 12 wherein the filter includes a low pass filter provided to decrease the magnitude of an electrical spur induced by feed-through of at least one of the output signals of the control signal generator.

14. A method of reducing clock feed-through in the combination of a switch and switch controller, the method comprising:
providing a controllable source including at least two sub-circuits, each sub-circuit configured to receive a respective control signal and draw from a supply in response to receiving the respective control signal;
providing a respective control signal to each of the respective at least two sub-circuits, and at least two of the control signals are characterized by a non-zero phase difference; and
dithering at least one of the at least two control signals provided by the control signal generator.

15. An apparatus comprising:
means for delivering an electrical signal including at least two sub-circuits, each sub-circuit is configured to receive a respective control signal and draw from a supply in response to receiving the respective control signal;
means for generating control signals configured to provide at least two control signals separated by at least one non-zero phase difference; and
means for dithering at least one of the at least two control signals provided by the means for generating control signals.

16. The apparatus of claim 15 wherein the apparatus is included on a radio-frequency (RF) wireless device within a switch controller that is configured to control an RF switch of the RF wireless device.

17. A computer program product for reducing clock feed-through including a non-transitory computer readable medium comprising instructions that when executed cause an apparatus to:
provide a respective control signal to each of at least two sub-circuits included in a controllable electrical source, at least two of the control signals being characterized by a non-zero phase difference, and each of the at least two sub-circuits being configured to receive a respective control signal and draw from a supply in response to receiving the respective control signal; and
dither at least one of the at least two control signals.

* * * * *